Feb. 15, 1966  M. G. BEKKER  3,235,020
VEHICLE WITH FLEXIBLE FRAME
Filed Sept. 19, 1962  3 Sheets-Sheet 1

INVENTOR.
Mieczyslaw G. Bekker
BY
E. W. Christen
ATTORNEY

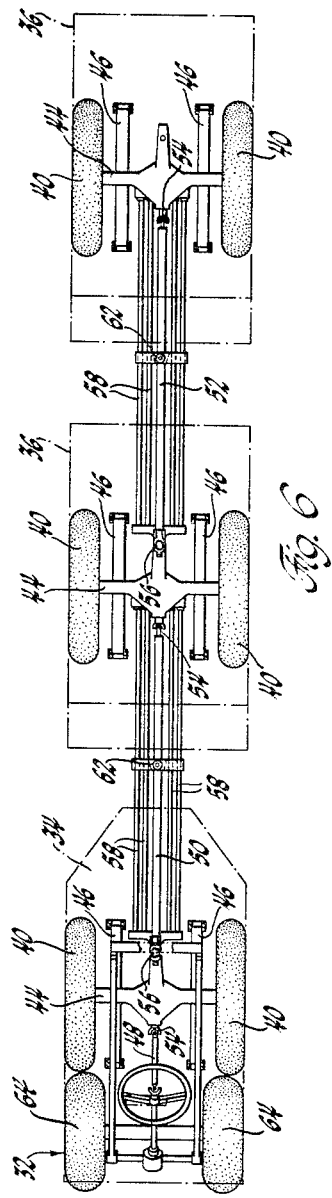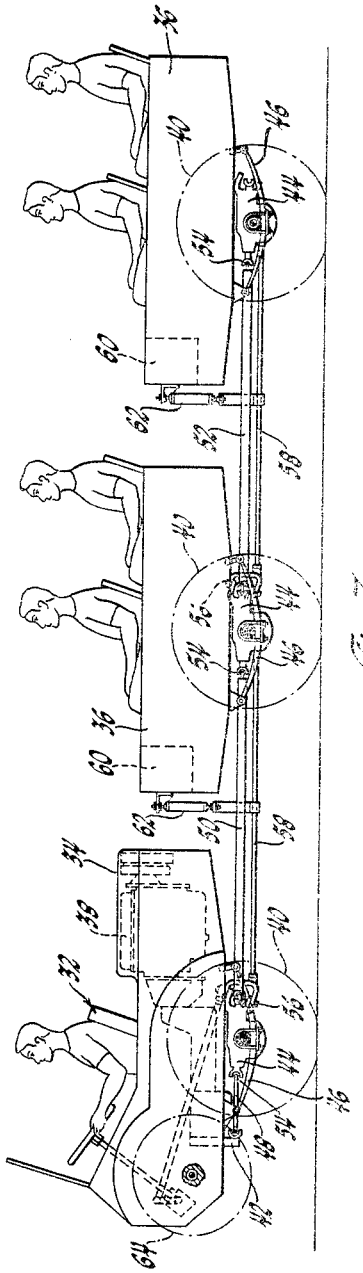

United States Patent Office 3,235,020
Patented Feb. 15, 1966

3,235,020
VEHICLE WITH FLEXIBLE FRAME
Mieczyslaw G. Bekker, Santa Barbara, Calif., assignor to General Motors Corporation, Detroit, Mich., a corporation of Delaware
Filed Sept. 19, 1962, Ser. No. 224,754
4 Claims. (Cl. 180—12)

This invention relates to motor vehicles and more particularly to one especially adapted for operation over unpaved terrain.

Unpaved terrain, such as is encountered in exploring the waste lands of the world, and such as may be expected in planetary explorations, has caused the development of a special family of land trains. In general, these trains consist of a series of independently powered vehicle units which are suitably connected so that each unit can follow the immediate underlying ground contour. The present invention is primarily aimed at improving the suspension and articulation of such vehicle units.

In the drawings:

FIGURE 6 is a plan view of another vehicle according to the invention and adapted for more prosaic earth operation; and FIGURE 7 is a side view of the vehicle of FIGURE 4.

Figure 1:
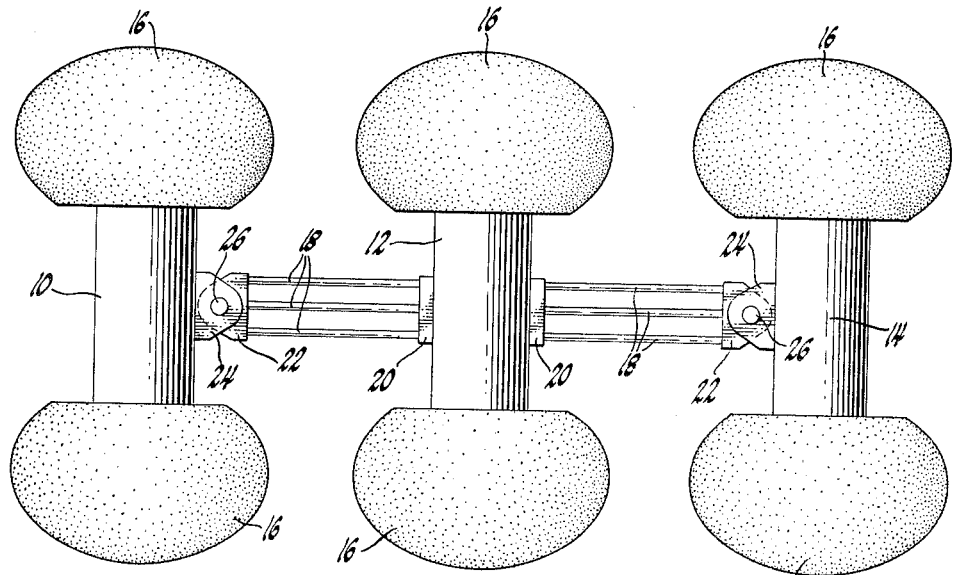
FIGURE 1 is a plan view of a vehicle in accordance with the invention and especially adapted for rocket transport and lunar exploration.

Referring to the drawings, the train consists of vehicle units 10, 12 and 14, each of which may contain independent power plants and passenger or cargo space. The units ride on wheels 16, all of which may be driven. If desired, power may be obtained from only one unit and the other units may merely act as trailers. However, this is not preferred for the tractive effort of the other units is thus sacrificed.

The units are connected to each other by spring rods 18. Plates 20 connect the inner ends of the spring rods 18 to the unit 12 and plates 22 connect the outer ends of the spring rods. The plates 22 are generally vertically pivoted by plates 24 and king pins 26 to the units 10 and 14.

Figure 2:
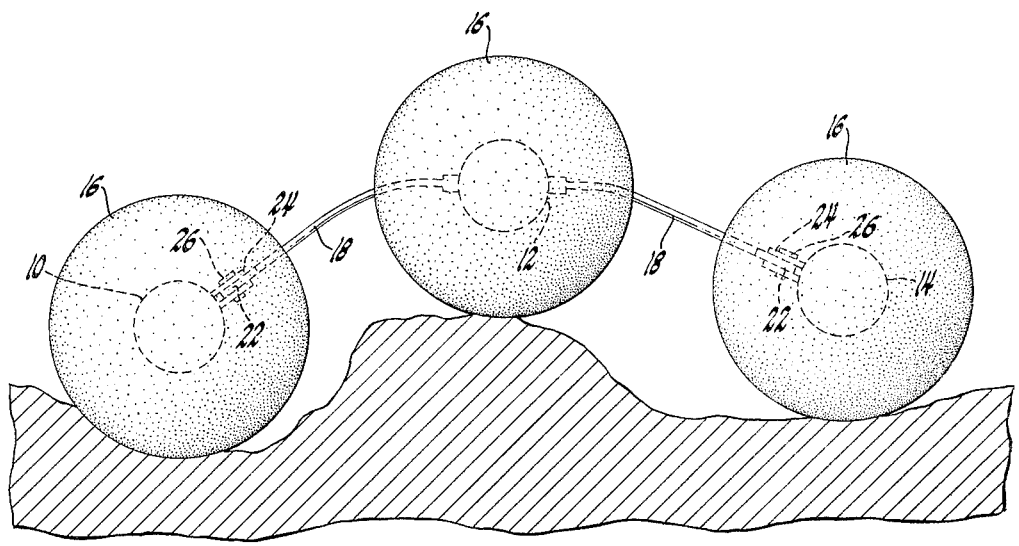
FIGURE 2 is a side view of the vehicle.

As seen in FIGURES 1 and 2, the rods 18 lie in the lateral or horizontal plane of the vehicle. The rods are relatively thin and they are thus quite flexible in vertical or pitch direction and, in effect, form a thin leaf spring extending horizontally between the units so that the units can have elevational displacement between them to accommodate variances in ground level, as seen in FIGURE 2. A single, thin leaf spring can be used in place of the rods 18 if desired.

Referring to FIGURE 1, it is seen that the rods 18, because of their lateral spacing, form a beam which is inflexible to bending in the lateral plane. The units 10, 12 and 14 are thus held in alignment insofar as lateral displacement is concerned, and this, of course, allows proper steering of the vehicle by the provision of the pivots 26 which allow the end units to turn with respect to the center unit. Conventional means may be used to turn units 10 and 14 with respect to the unit 12.

Figure 3:
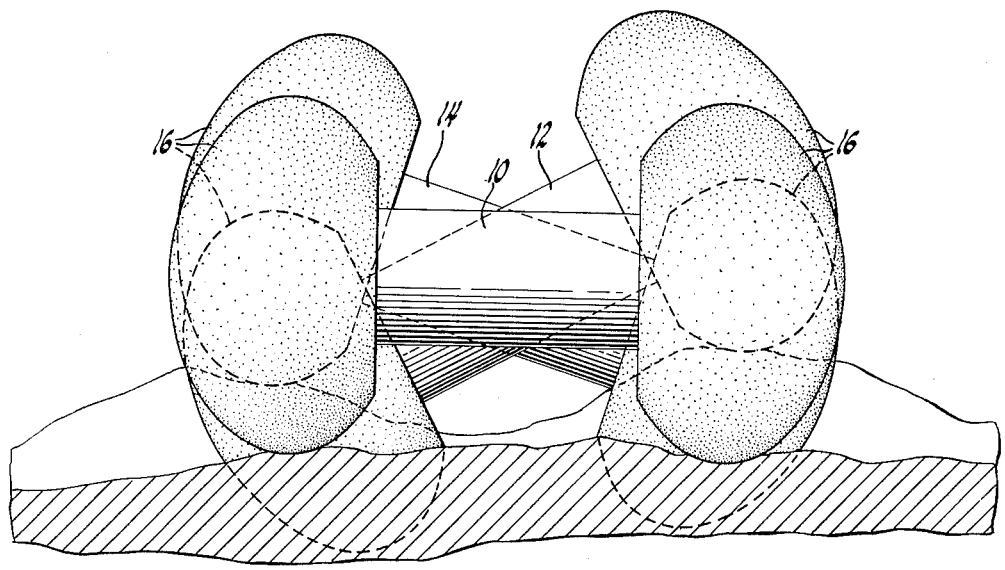
FIGURE 3 is an end view of the vehicle.

The rods 18 also provide torsional or roll flexibility around the longitudinal axis of the vehicle, as is evident from FIGURE 3, so that the units can accommodate to lateral unevenness of ground surface.

The spring means or rods 18 form, in effect, an elastic frame for the vehicle train. While flexible, the rods are rigid enough in longitudinal direction to transfer propulsion force between the units and to balance the driving torques imparted to the units by their wheels. For example, if the forward unit 10 is to climb a steep obstacle, a pushing force form the rearward units is transferred by the spring rods 18 to the forward unit to enable it to climb the obstacle even though the forward unit has insufficient tractive effort in itself to do so.

Figure 4:
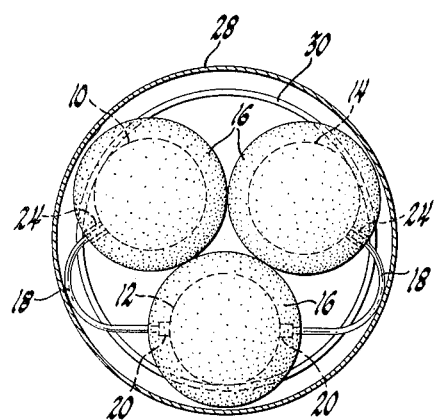
FIGURE 4 is a side view of the vehicle in collapsed condition for compact stowage in a rocket casing.
Figure 5:
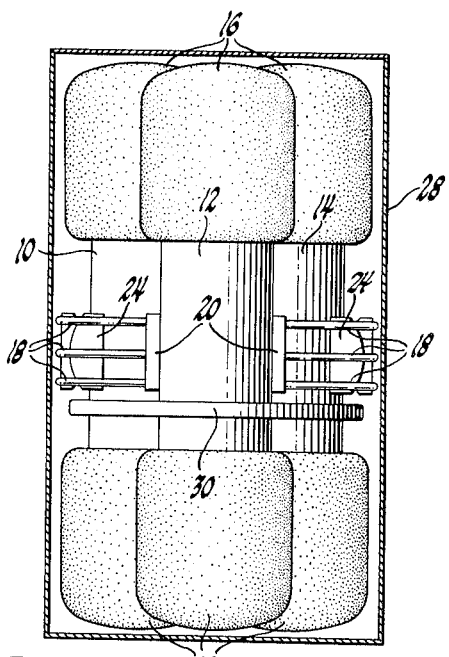
FIGURE 5 is a plan view of the vehicle in stowage position.

Referring to FIGURES 4 and 5, it is seen that the units can be collapsed together because of the flexibility of the spring rods to fit within a rocket casing or container 28. In this stowed position, the wheels are deflated and the units are held together by a releasable band 30. When the container 28 lands on the surface to be explored, automatic means can be used to fragment the container, as by explosive rivets, to release the locking band and to inflate the wheels. The spring rods 18 straighten with release of the locking band 30 to put the vehicle in operating position, and the size of the wheels insures that the vehicle will operate regardless of which side comes up on top.

A more conventional application of the inventive concept is seen in FIGURES 6 and 7 wherein a vehicle 32 for earth transport is shown. The vehicle 32 comprises a driver unit 34 and a pair of powered trailer units 36. The driver unit 34 has an engine 38 which powers the wheels 40 from a transmission 42. The paired wheels of each unit are carried by axles 44 and these axles suspend the body portions of the units by leaf springs 46.

Drive shafts 48, 50 and 52 transfer power from the transmission 42 through the axles 44 to the wheels 40 and are provided with universal joints 54 at each end to accommodate the movement of the units. The rear ends of the axle units 44 carry conventional, inclined center steering king pins 56 to which are pivotally secured the rigidly joined ends of laterally arranged spring rods 58. The spring rods 58 are connected at their other ends to the front ends of the trailer axles. Conventional means may be used to turn the forward unit on the front king pin axis with respect to the second unit to provide steering control and the rearmost unit can trail freely behind the second unit about the rear king pin.

As in the case of the vehicle of FIGURES 1 to 5, each unit of the vehicle of FIGURES 6 and 7 is afforded pitch flexibility for up and down movement, and also torsional flexibility for tilting or roll movement by the spring rods which, however, maintain them in trailing relation and permit the interexchange of tractive effort. If desired, stabilization of the sprung body portions 60 of the individual units can be increased by providing spring or damper connections 62 between the body portions of the units and the spring rods 58 or between the body portions of adjacent units. The lead unit may also be provided with a pair of bogie wheels 64 to aid in crossing obstacles. While the lead unit is shown as a two-wheel unit, in some cases it may be desirable to use a four-wheel, rigid frame vehicle for the lead unit.

While the invention has been described with reference to two embodiments, it is obvious that the invention may also be applied to other embodiments which may fall within the scope of the claims which follow.

I claim:

1. A vehicle adapted for rough terrain operation comprising a plurality of units, each unit including a body, an axle having a pair of wheels and spring suspension means supporting the body on the axle, the weight of each unit being independently borne by the respective wheels thereof, and spring frame means having an effective cross section thin in vertical direction and thick in horizontal direction and connecting one unit to another, the spring frame means thus being highly flexible in pitch and roll direction and inflexible in lateral direction and having a force transferring rigid connection at one end to the axle of one unit and a generally vertical pivot connection at the other end to the axle of the other unit.

2. A vehicle in accordance with claim 1 including means for powering each of the units.

3. A vehicle in accordance with claim 2 including sway dampening means connected to the bodies.

4. A vehicle adapted for rough terrain operation comprising a plurality of units, each unit having a pair of wheels, the weight of each unit being independently borne by the respective wheels thereof, and spring frame means having an effective cross section thin in vertical direction and thick in horizontal direction and connecting one unit to another, the spring frame means thus being highly flexible in pitch and roll direction and inflexible in lateral direction and having a force transferring rigid connection at one end to one unit and a generally vertical pivot connection at the other end to the other unit.

References Cited by the Examiner

UNITED STATES PATENTS

| 933,794 | 9/1909 | Sprung | 280—483 |
| 1,146,880 | 7/1915 | Jahnke | 280—283 X |
| 1,305,228 | 5/1919 | Maxwell | 180—14 |
| 1,343,790 | 6/1920 | Sandstrom | 280—483 X |
| 2,189,183 | 2/1940 | Sherman | 280—483 |
| 2,537,245 | 1/1951 | Thompson | 280—485 |
| 2,849,073 | 8/1951 | Gaspardo | 180—11 X |

FOREIGN PATENTS

| 986,837 | 4/1951 | France. |
| 404,936 | 7/1943 | Italy. |

BENJAMIN HERSH, *Primary Examiner.*

LEO FRIAGLIA, KENNETH H. BETTS, A. HARRY LEVY, *Examiners.*